(12) United States Patent
Shah et al.

(10) Patent No.: US 12,536,979 B2
(45) Date of Patent: *Jan. 27, 2026

(54) ELECTRONIC DEVICE WITH A DISPLAY FOR LOW LIGHT CONDITIONS

(71) Applicant: Apple Inc., Cupertino, CA (US)

(72) Inventors: Ritu Shah, Sunnyvale, CA (US); Ryan J. Dunn, Santa Cruz, CA (US); Tom Sengelaub, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/907,280

(22) Filed: Oct. 4, 2024

(65) Prior Publication Data

US 2025/0104669 A1    Mar. 27, 2025

Related U.S. Application Data

(63) Continuation of application No. 18/189,422, filed on Mar. 24, 2023, now Pat. No. 12,142,243, which is a continuation of application No. PCT/US2021/050484, filed on Sep. 15, 2021.

(60) Provisional application No. 63/082,752, filed on Sep. 24, 2020.

(51) Int. Cl.
*G09G 5/10* (2006.01)
*G06F 3/01* (2006.01)
*G06T 7/90* (2017.01)
*G06V 10/25* (2022.01)
*G09G 3/34* (2006.01)

(52) U.S. Cl.
CPC .............. *G09G 5/10* (2013.01); *G06F 3/013* (2013.01); *G06T 7/90* (2017.01); *G06V 10/25* (2022.01); *G09G 3/3413* (2013.01); *G06T 2207/10024* (2013.01); *G09G 2320/0626* (2013.01); *G09G 2360/144* (2013.01)

(58) Field of Classification Search
CPC .................. G09G 5/10; G09G 3/3413; G09G 2320/0626; G09G 2360/144; G06T 7/90; G06T 2207/10024; G06V 10/25; G06F 3/013
USPC ....................................................... 345/690
See application file for complete search history.

(56) References Cited

U.S. PATENT DOCUMENTS

| | | | |
|---|---|---|---|
| 8,760,400 | B2 | 6/2014 | Kerr |
| 9,442,293 | B2 | 9/2016 | Alton |
| 10,013,806 | B2 | 7/2018 | O'Connor |
| 10,586,482 | B1 | 3/2020 | Yung |

(Continued)

FOREIGN PATENT DOCUMENTS

| CN | 103383491 A | 11/2013 |
|---|---|---|
| CN | 205246972 U | 5/2016 |

(Continued)

*Primary Examiner* — Jennifer T Nguyen
(74) *Attorney, Agent, or Firm* — Blank Rome LLP

(57) ABSTRACT

Operating an outward-facing display device for low light conditions may include receiving information indicative of ambient lighting conditions for the display device's environment; in accordance with a determination that the ambient lighting conditions do not satisfy a brightness criterion, determining a set of pixels in the outward-facing display device corresponding to an area of interest in the environment; and driving the set of pixels at a particular brightness to improve lighting in the area of interest.

17 Claims, 14 Drawing Sheets

(56) References Cited

U.S. PATENT DOCUMENTS

| | | | |
|---|---|---|---|
| 11,589,021 | B1 | 2/2023 | Kuang |
| 12,142,243 | B2 * | 11/2024 | Shah .......................... G06T 7/90 |
| 2016/0005362 | A1 | 1/2016 | Chen |
| 2020/0098335 | A1 | 3/2020 | Chen |
| 2020/0103656 | A1 | 4/2020 | Iglesias |
| 2021/0133452 | A1 * | 5/2021 | Berkovich ............. H04N 23/45 |
| 2021/0258457 | A1 * | 8/2021 | Akkaya ................. G01S 17/894 |
| 2021/0350624 | A1 * | 11/2021 | Komp ................... G06T 19/006 |

FOREIGN PATENT DOCUMENTS

| | | |
|---|---|---|
| CN | 106506909 A | 3/2017 |
| CN | 110958738 A | 4/2020 |
| CN | 110968191 A | 4/2020 |
| JP | 2017175738 A | 9/2017 |

* cited by examiner

ELECTRONIC DEVICE WITH A DISPLAY FOR LOW LIGHT CONDITIONS

BACKGROUND

This disclosure relates generally to display operation. More particularly, but not by way of limitation, this disclosure relates to techniques and systems for automatically operating an outward-facing display device for low light conditions.

Display devices may be used in a variety of environmental conditions such as bright sunlight, overhead fluorescent lighting, and dim or low lighting. While many electronic devices include light sources to enable flashlight functions, what is needed is an improved technique to illuminate the environment of the outward-facing display device.

DETAILED DESCRIPTION

Figure 1:
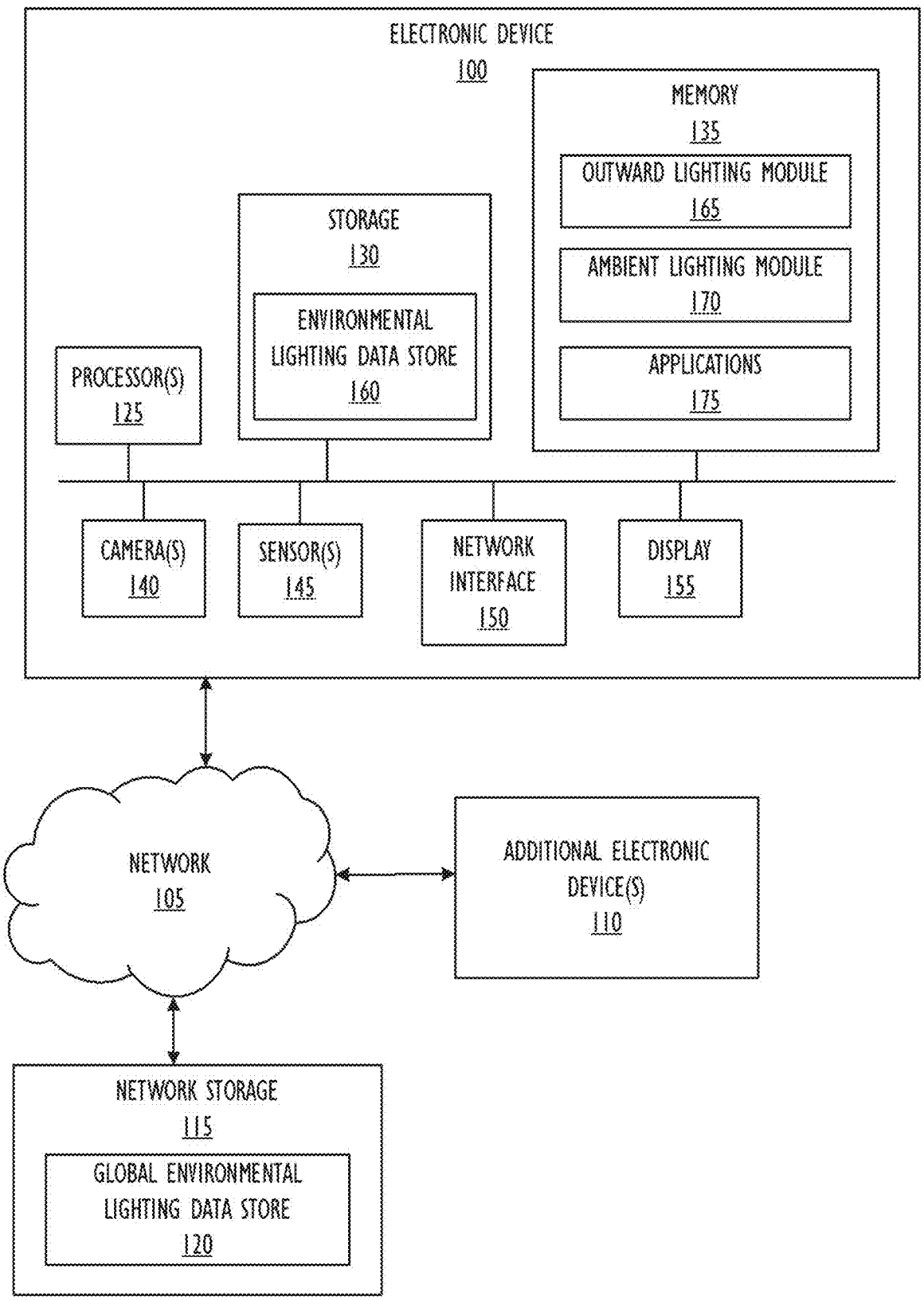
FIG. 1 shows, in block diagram form, exemplary systems including various outward-facing display devices for use in low light conditions, including extended reality environments.

This disclosure pertains to systems, methods, and computer readable media to operate an outward-facing display device to illuminate an environment. In particular, information indicative of ambient lighting conditions for an outward-facing display device may be received. The ambient lighting conditions may be determined not to satisfy a brightness criterion. In accordance with the determination, a set of pixels in the outward-facing display device corresponding to an area of interest in the environment may be determined. Then, the set of pixels in the outward-facing display device may be driven at a particular brightness to improve lighting in the area of interest.

According to some embodiments, the information indicative of ambient lighting conditions comprises a brightness of the ambient lighting and a light color of the ambient lighting. The set of pixels may be driven at the light color to match the ambient lighting. In some embodiments, the information indicative of the ambient lighting conditions includes information for a plurality of regions in the environment, and whether at least one region of the plurality of regions do not satisfy the brightness criterion is determined.

In some embodiments, the area of interest may be determined based on an indicator from a gaze-tracking user interface and/or an input region for a gesture-based user interface. In some embodiments, an outward-facing camera may capture an image of the environment, and information indicative of the ambient lighting conditions may be determined based on the image of the environment. An outward-facing display device may face away from a user of the device, such that it emanates light into an ambient environment while positioned facing away from the user. In some embodiments, the outward-facing display device may emit a color sequence, and the outward-facing camera may capture an image of the environment for each color of the color sequence. An environmental color of interest may be determined based on the set of images, and the set of pixels may be driven at a particular color based on the environmental color of interest. In some embodiments, the outward-facing camera is a black and white camera, and the environmental color of interest may be determined by identifying a particular image comprising a strongest signal and a corresponding color of the color sequence. In some embodiments, a media item associated with the brightness criterion may be displayed on an inward-facing display device. An inward-facing display device may face towards a user of the device, such that a projection from the inward-facing display device and a projection from the outward-facing display device do not intersect.

Various examples of electronic systems and techniques for using such systems in relation to various extended reality technologies are described.

A person can interact with and/or sense a physical environment or physical world without the aid of an electronic device. A physical environment can include physical features, such as a physical object or surface. An example of a physical environment is physical forest that includes physical plants and animals. A person can directly sense and/or interact with a physical environment through various means, such as hearing, sight, taste, touch, and smell. In contrast, a person can use an electronic device to interact with and/or sense an extended reality (XR) environment that is wholly or partially simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command).

Many different types of electronic systems can enable a user to interact with and/or sense an XR environment. A non-exclusive list of examples include heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of graphics modeling systems having the benefit of this disclosure.

Referring to FIG. 1, a simplified block diagram of an electronic device 100 is depicted, communicably connected to additional electronic devices 110 and a network storage 115 over a network 105, in accordance with one or more embodiments of the disclosure. Electronic device 100 may be part of a multifunctional device, such as a mobile phone, tablet computer, personal digital assistant, portable music/video player, wearable device, head-mounted systems, projection-based systems, base station, laptop computer, desktop computer, network device, or any other electronic systems such as those described herein. Electronic device 100, additional electronic device 110, and/or network storage 115 may additionally, or alternatively, include one or more additional devices within which the various functionality may be contained, or across which the various functionality may be distributed, such as server devices, base stations, accessory devices, and the like. Illustrative networks, such as network 105 include, but are not limited to, a local network such as a universal serial bus (USB) network, an organization's local area network, and a wide area network such as the Internet. According to one or more embodiments, electronic device 100 is utilized to illuminate an environment of the device 100. It should be understood that the various components and functionality within electronic device 100, additional electronic device 110 and network storage 115 may be differently distributed across the devices, or may be distributed across additional devices.

Electronic device 100 may include one or more processors 125, such as a central processing unit (CPU). Processor(s) 125 may include a system-on-chip such as those found in mobile devices and include one or more dedicated graphics processing units (GPUs). Further, processor(s) 125 may include multiple processors of the same or different type. Electronic device 100 may also include a memory 135. Memory 135 may include one or more different types of memory, which may be used for performing device functions in conjunction with processor(s) 125. For example, memory 135 may include cache, ROM, RAM, or any kind of transitory or non-transitory computer readable storage medium capable of storing computer readable code. Memory 135 may store various programming modules for execution by processor(s) 125, including outward lighting module 165, ambient lighting module 170, and other various applications 175. Electronic device 100 may also include storage 130. Storage 130 may include one more non-transitory computer-readable mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Storage 130 may be configured to store environmental lighting data 160, according to one or more embodiments.

Electronic device 100 may also include one or more cameras 140 or other sensors 145, such as a depth sensor from which depth of a scene may be determined. In one or more embodiments, each of the one or more cameras 140 may be a traditional RGB camera, or a black and white camera. Further, cameras 140 may include a stereo- or other multi-camera system, a time-of-flight camera system, or the like. Sensors 145 may also include sensors such as an accelerometer, a gyroscope, or other motion sensor. Electronic device 100 may also include a display 155. The display device 155 includes an outward-facing display device. In some embodiments, display device 155 may additionally include an inward-facing display device. The outward-facing display and the inward-facing display may be situated in the electronic device 100 such that the inward-facing display faces toward a user and the outward-facing display faces away from the user and into the environment. As an example, a projection from the inward-facing display and the outward-facing display may not intersect. The display device 155 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Storage 130 may be utilized to store various data and structures which may be utilized for determining ambient lighting conditions of electronic device 100 in order to operate an outward-facing display device 155 to illuminate a dim environment. Storage 130 may include, for example, environmental lighting data store 160. Environmental lighting data store 160 may be utilized to store information indicative of ambient lighting conditions for a current physical environment of electronic device 100 or a predetermined set of ambient lighting conditions associated with environments in which electronic device 100 is likely to be used. In one or more embodiments, environmental lighting data may include information indicative of low-light ambient lighting conditions associated with a dark room, overhead fluorescent ambient lighting conditions associated with an office environment, bright sunlight ambient lighting conditions associated with an outdoor, sunny environment, and the like which may be utilized by outward lighting module 165 to drive pixels in display 155 to illuminate the environment. In one or more embodiments, environmental lighting data may be stored occasionally, periodically, or in response to a trigger, such as a threshold change in position of electronic device 100 detected by a sensor 145 and the like. In one or more embodiments, the environmental lighting data may be stored locally at each system, such as electronic device 100 and additional electronic devices 110, and/or the geometric information may be stored in global environmental lighting data store 120 as part of network storage 115.

According to one or more embodiments, memory 135 may include one or more modules that comprise computer readable code executable by the processor(s) 125 to perform functions. The memory may include, for example an outward lighting module 165 which may be used to drive an outward-facing display device 155 to illuminate the environment of electronic device 100. The outward lighting module 165 may determine ambient lighting conditions for the environment of electronic device 100 and whether the ambient lighting conditions satisfy a brightness criterion in order to drive particular pixels of display device 155 at a particular brightness. In some embodiments, outward lighting module 165 obtains information indicative of the ambient lighting conditions from ambient lighting module 170. The memory may also include, for example, other applications 175 which may be used to determine an appropriate brightness criterion for outward lighting module 165. For example, other applications 175 may include a media management application that determines an appropriate brightness criterion based on a media item displayed on an inward-facing display device, and the like.

Although electronic device 100 is depicted as comprising the numerous components described above, in one or more embodiments, the various components may be distributed across multiple devices. Accordingly, although certain calls and transmissions are described herein with respect to the particular systems as depicted, in one or more embodiments, the various calls and transmissions may be made differently directed based on the differently distributed functionality. Further, additional components may be used, some combination of the functionality of any of the components may be combined.

Figure 2:
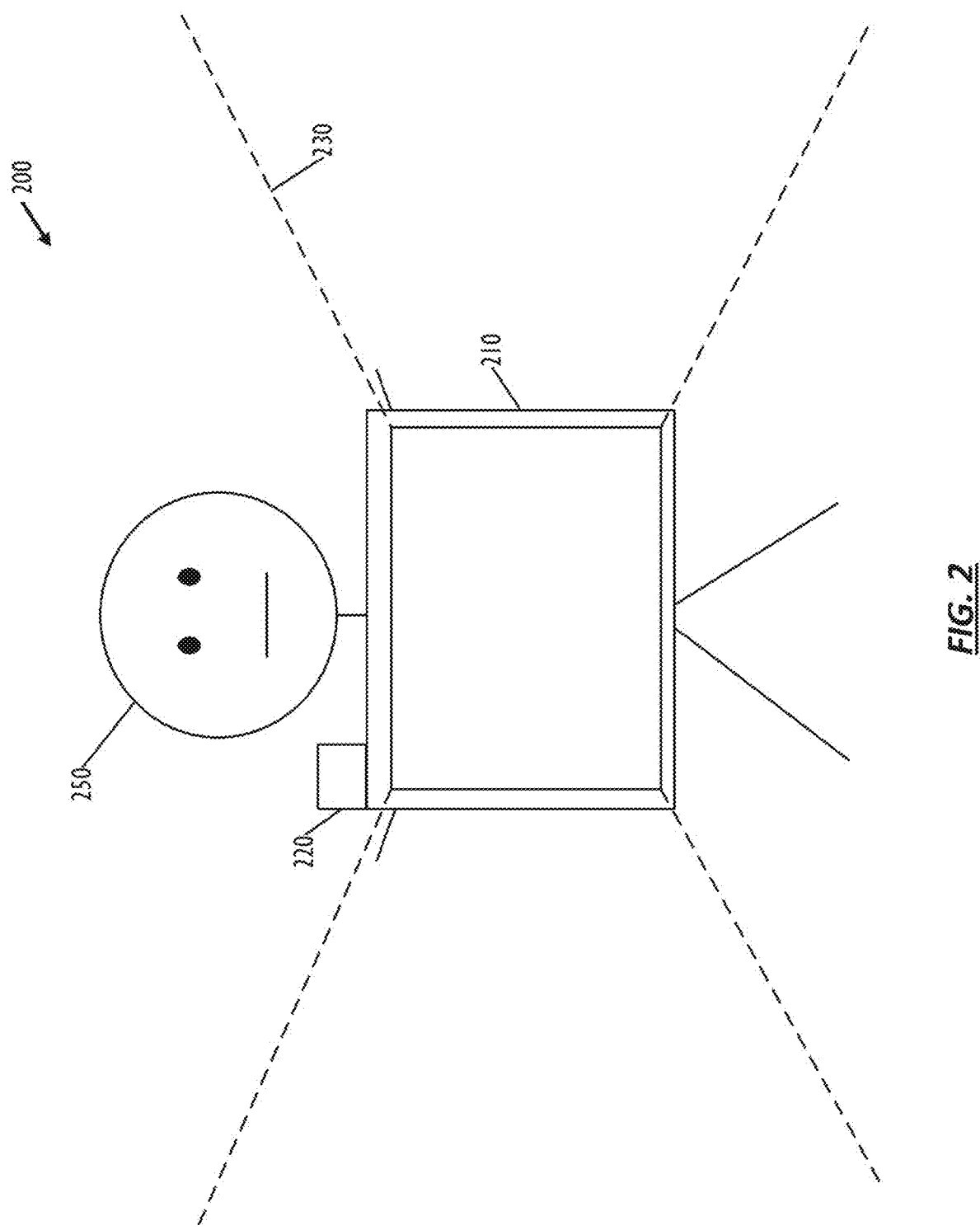
FIG. 2 shows a diagram of an example operating environment for an electronic device comprising an outward-facing display, according to one or more embodiments.

FIG. 2 shows a diagram of an example operating environment for an outward-facing display device, according to one or more embodiments. While pertinent features are shown, those of ordinary skill in the art will appreciate from the present disclosure that various other features have not been illustrated for the sake of brevity and so as not to obscure more pertinent aspects of the example among implementations disclosed herein. To that end, as a nonlimiting example, the operating environment 200 includes an optional outward-facing optical sensor 220.

As shown in FIG. 2, a user 250 is depicted as utilizing an electronic device that has an outward-facing display 210 and an outward-facing optical sensor 220. In one or more embodiments, the electronic device includes a mobile device, such as a handheld device, a tablet device, a wearable device, and the like. Optical sensor 220 may be configured to determine ambient lighting conditions for operating environment 200 in which outward-facing display 210 is located and may comprise, for example, a photodiode, a camera, an ambient light sensor, and the like, or some combination thereof. The outward-facing display device 210 may be configured to illuminate a field of view 230 in operating environment 200, present information to a user nearby user 250, or both.

Figure 3:
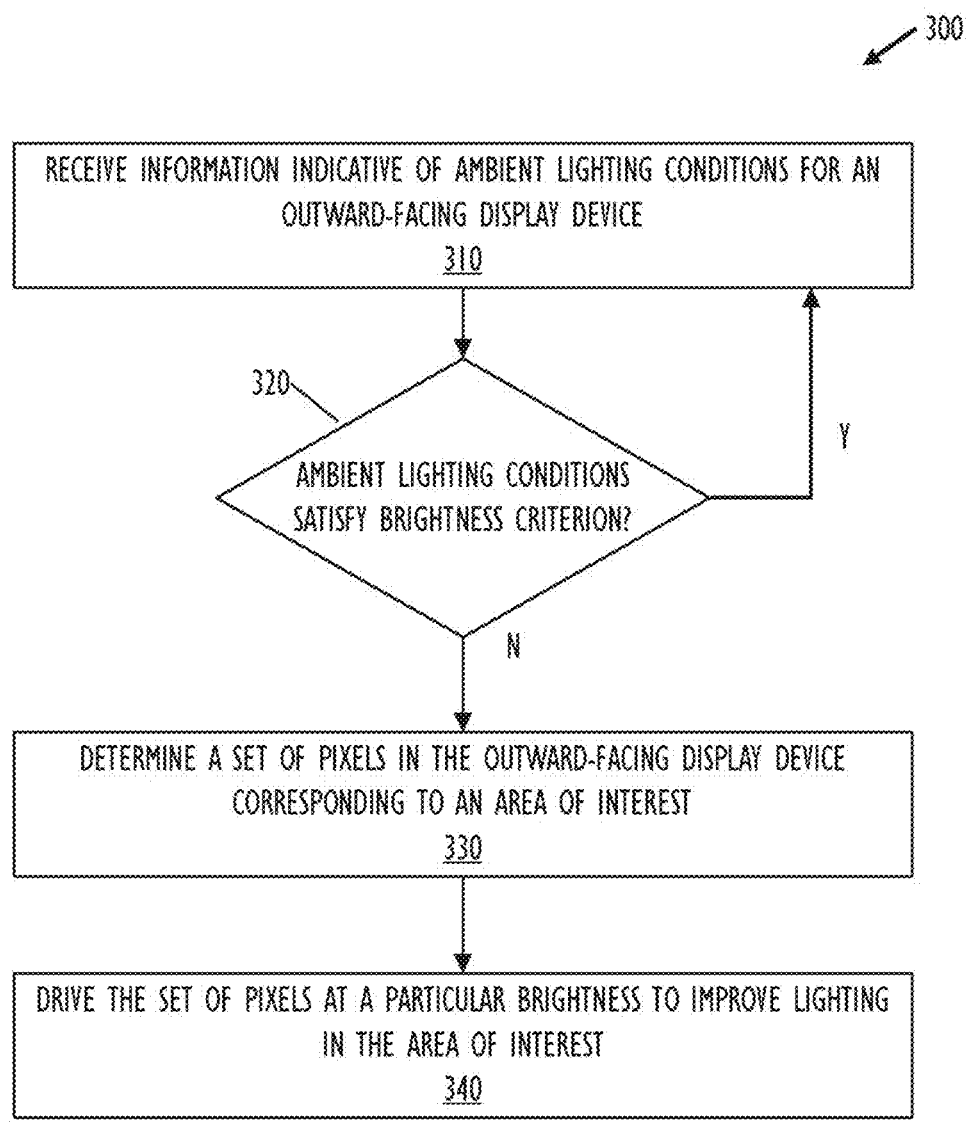
FIG. 3 shows, in flow chart form, an example process for operating an outward-facing display in an electronic device in low light conditions, according to one or more embodiments.

FIG. 3 shows, in flow chart form, an example process for operating an outward-facing display in an electronic device in low light conditions, according to one or more embodiments. For purposes of explanation, the following steps will be described in the context of FIGS. 1 and 2. However, it should be understood that the various actions may be taken by alternate components. In addition, the various actions may be performed in a different order. Further, some actions may be performed simultaneously, and some may not be required, or others may be added, according to various embodiments. The various actions may be performed remotely by a server device, by a single electronic device, and/or distributed between multiple electronic devices.

The flow chart begins at 310, where outward lighting module 165 receives information indicative of ambient lighting conditions for an environment in which an outward-facing display device is located, such as in environment 200 for display 210. Outward lighting module 165 may receive the information indicative of ambient lighting conditions from ambient lighting module 170, environmental lighting data store 160 in storage 130, global environmental lighting data store 120 in network storage 115, optical sensor 220, and the like. At 320, outward lighting module 165 determines whether the ambient lighting conditions satisfy a brightness criterion. The brightness criterion may represent a threshold brightness of the environment such that user 250 is determined to be able to see and move around in environment 200, an object recognition application included in applications 175 is able to track objects in environment 200, a gesture-based user interface is able to recognize gestures performed by user 250, and the like. The brightness criterion may comprise other lighting parameters in addition to or instead of the measured intensity level of ambient lighting, such as the lighting color, direction, electromagnetic spectrum signature, and the like. In accordance with a determination that the ambient lighting conditions satisfy the brightness criterion, outward lighting module 165 may return to block 310 and receive information indicative of updated ambient lighting conditions in the environment continuously, periodically at regular intervals, in response to a trigger, and the like.

In accordance with a determination that the ambient lighting conditions do not satisfy the brightness criterion in block 320, outward lighting module 165 may determine a set of pixels in the outward-facing display device 210 corresponding to an area of interest in the environment in block 330. The area of interest may be an object of interest, a region of the environment where the hands of user 250 move for a gesture-based interface, a region of the environment towards which user 250 is moving, and the like. The set of pixels corresponding to an object of interest may be pixels that illuminate the object of interest. The set of pixels corresponding to a region of the environment where the hands of user 250 move may be pixels along the side portions of display 210 that illuminate the region. The set of pixels corresponding to the region of the environment towards which the user 250 is moving may be pixels along the bottom portion of display 210 that illuminate the ground and walking path of user 250.

Outward lighting module 165 then drives the set of pixels at a particular brightness to improve lighting in the area of interest at 340. Improving lighting in the area of interest may include increasing a brightness of the area of interest, changing a color of lighting in the area of interest, changing a direction of lighting in the environment towards the area of interest, and the like. The outward lighting module 165 may drive the set of pixels at a particular brightness value, a particular color value, a particular frequency range of light, and the like to improve lighting in the area of interest. The brightness of the ambient lighting in the environment 200 and the brightness of the light from the driven set of pixels illuminate environment 200 such that user 250 is able to see and move around in environment 200, the object recognition application in applications 175 is able to track objects in environment 200, the gesture-based user interface is able to recognize gestures, and the like based on the particular brightness criterion. By driving only the set of pixels corresponding to the area of interest, outward lighting module 165 ensures the area of interest is sufficiently illuminated without using excessive power by driving every pixel in display 210 or blinding user 250 with a suddenly over-bright environment. In addition, the remaining pixels are still available to present information to other users nearby user 250.

Figure 4A:
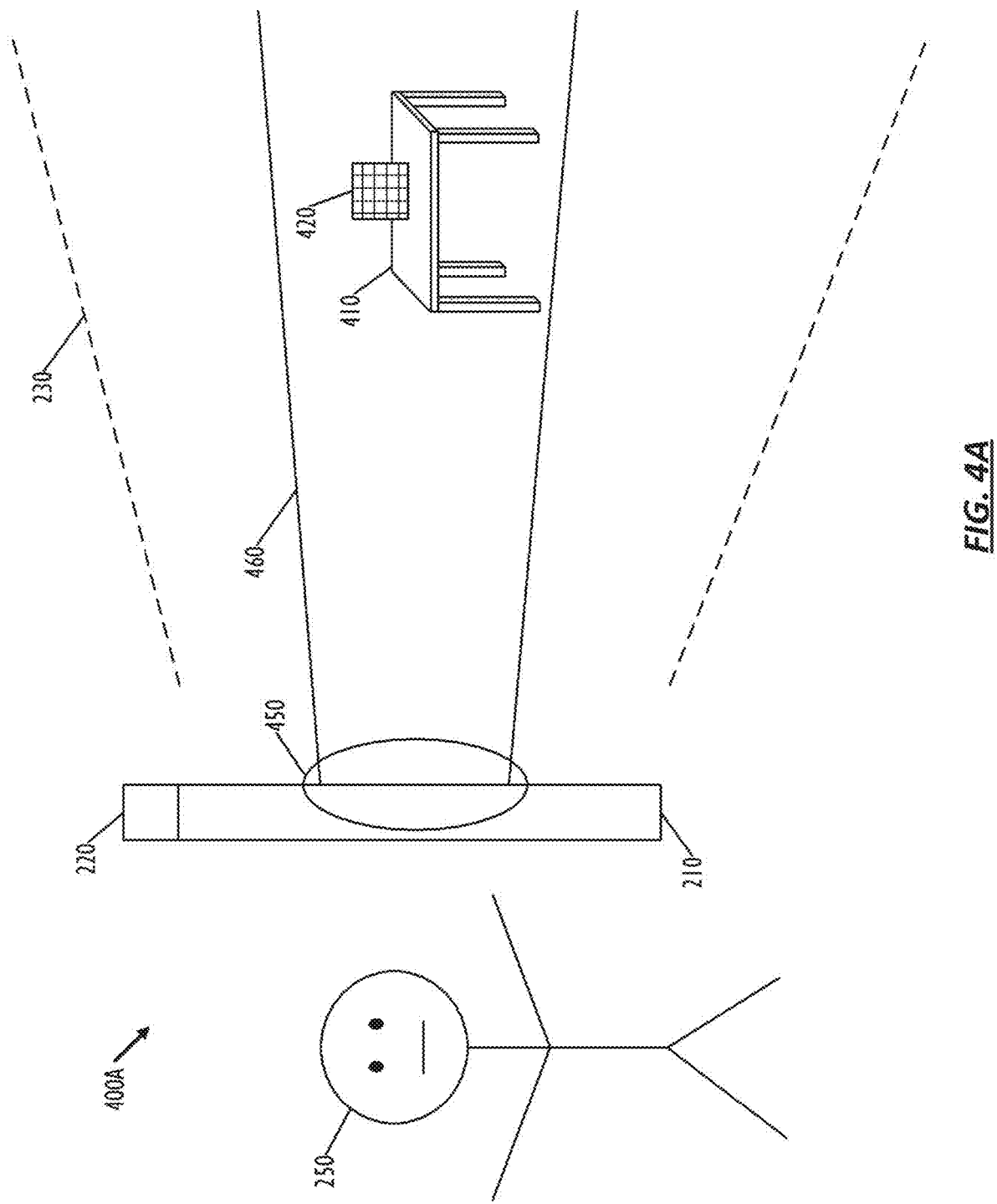
FIGS. 4A-4B show diagrams of an example operating environment for an outward-facing display in an electronic device performing the example process shown in FIG. 3, according to one or more embodiments.
Figure 4B:
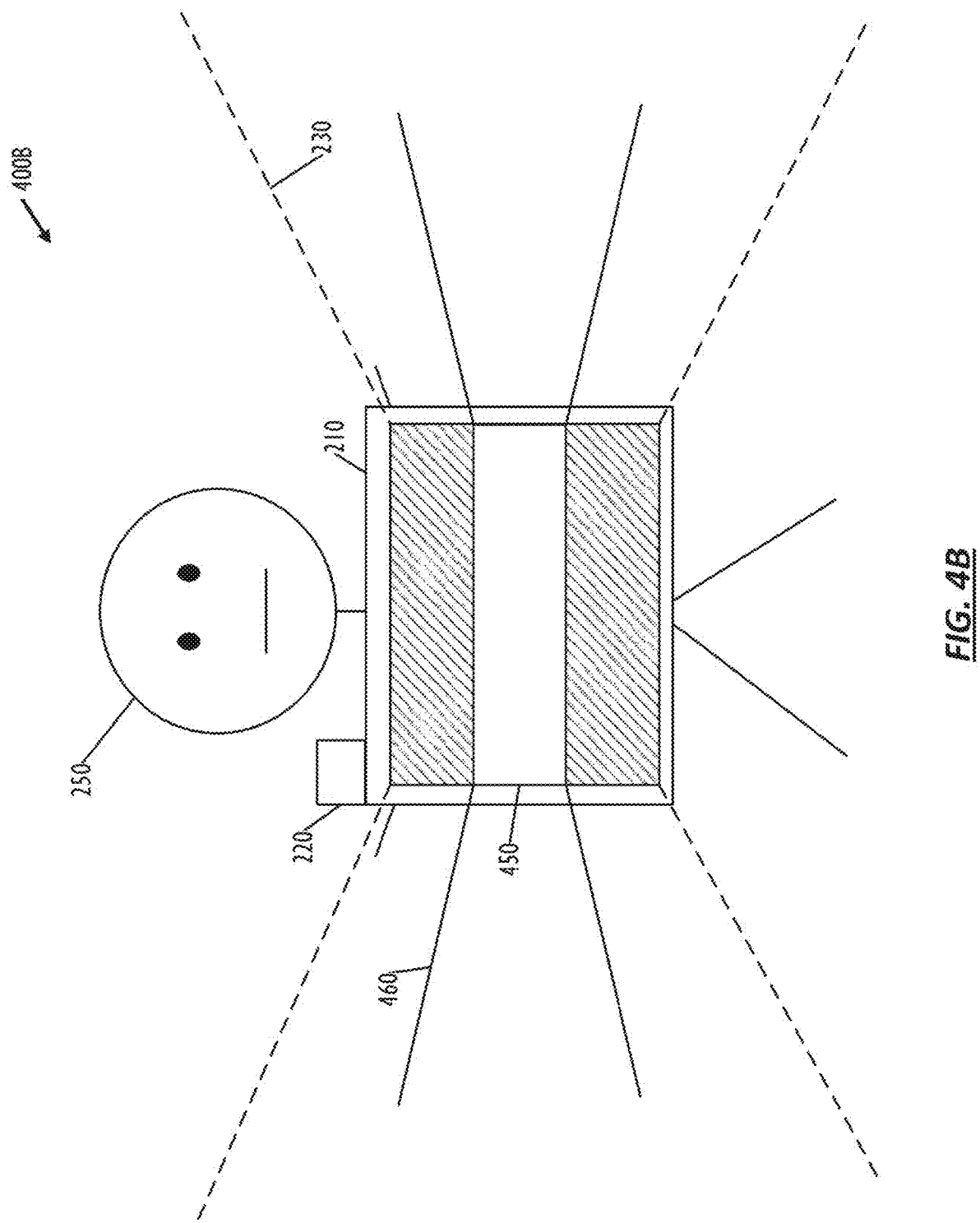

FIGS. 4A-B show diagrams of an example operating environment 400 for an outward-facing display in an electronic device performing the example process shown in FIG. 3, according to one or more embodiments. In the side view 400A shown in FIG. 4A, the optical sensor 220 may obtain information indicative of ambient lighting conditions in environment 400, and outward lighting module 165 may determine the ambient lighting conditions do not satisfy a brightness criterion. In response, outward lighting module 165 may drive the set of pixels indicated by region 450 at a particular brightness to illuminate a sub-field of view 460 within the larger field of view 230 of display device 210. The set of pixels 450 and the sub-field of view 460 are chosen to illuminate an object of interest 420 on a table 410 in the environment 400. FIG. 4B shows a front view 400B illustrating which pixels of display device 210 are included in region 450 to illuminate the sub-field of view 460 and the object of interest 420 shown in the side view 400A of FIG. 4A. The set of pixels 450 includes pixels in the middle portion of display 210 while pixels in the top and bottom portions of display 210 are left dark, or are available for other uses.

Figure 5:
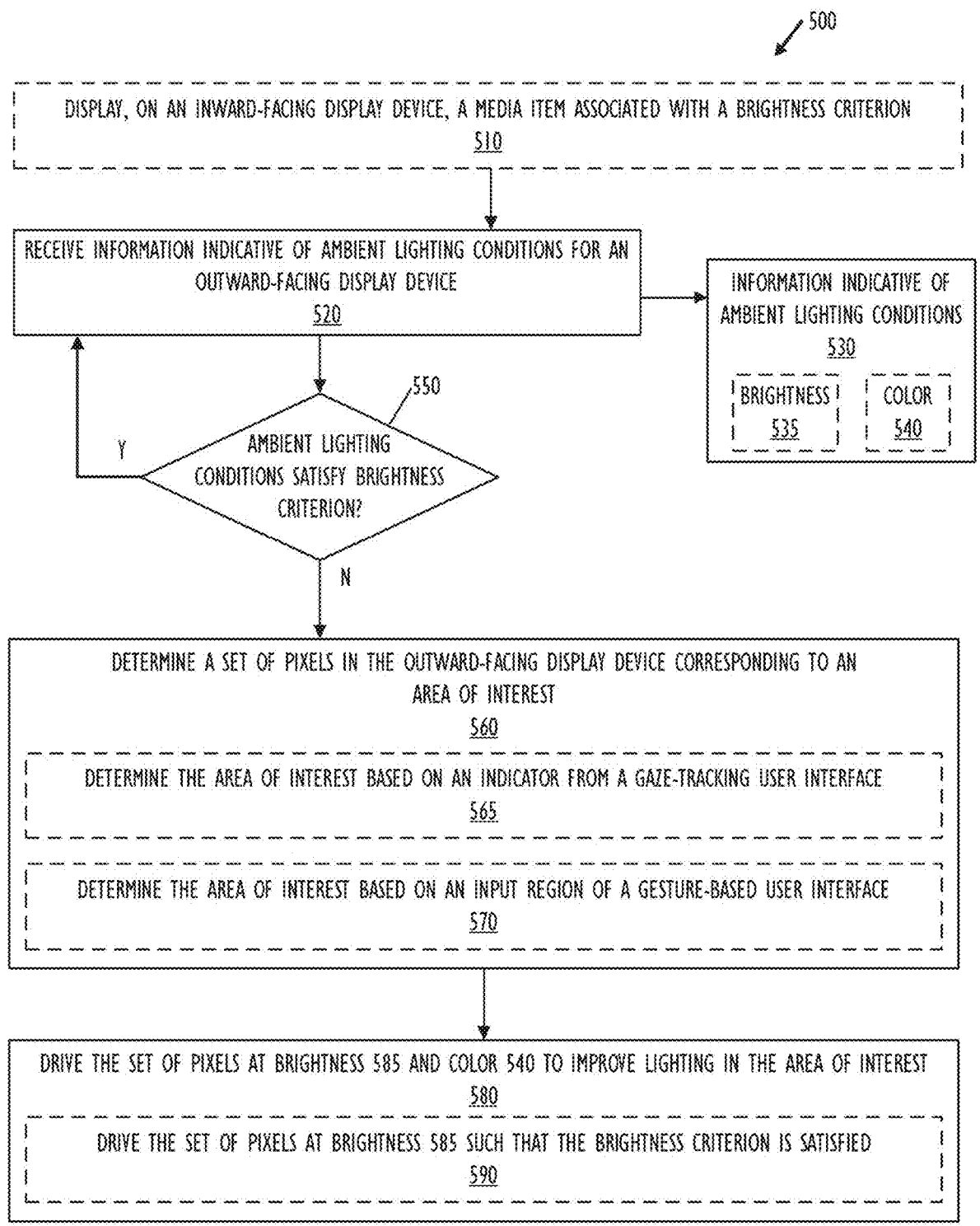
FIG. 5 shows, in flow chart form, a further example process for operating an outward-facing display in an electronic device in low light conditions, according to one or more embodiments.

FIG. 5 shows, in flow chart form, a further example process for operating an outward-facing display in an electronic device in low light conditions, according to one or more embodiments. In one or more embodiments, certain actions take place as part of determining a set of pixels corresponding to an area of interest in the environment. Still other actions comprise additional functionality. However, the various actions may take place in other locations within the flow chart of FIG. 5. For purposes of explanation, the following steps will be described in the context of FIGS. 1 and 2. However, it should be understood that the various actions may be taken by alternate components. In addition, the various actions may be performed in a different order. Further, some actions may be performed simultaneously, and some may not be required, or others may be added, according to various embodiments. The various actions may be performed remotely by a server device, by a single electronic device, and/or distributed between multiple electronic devices.

In some embodiments, display device 210 further comprises an inward-facing display. At 510, a media item associated with a brightness criterion is optionally displayed on the inward-facing display. For example, a movie may be displayed on the inward-facing display, and the movie is associated with brightness criterion representative of a dark threshold brightness, similar to the darkness of a movie theater. At 520, outward lighting module 165 receives information indicative of ambient lighting conditions for display device 210.

In some embodiments, the information indicative of ambient lighting conditions 530 comprises brightness information 535, indicative of a brightness of the ambient lighting conditions, and color information 540, indicative of a color of the ambient lighting conditions. For example, brightness information 535 may comprise a brightness rating, and color information 540 may comprise a color temperature. The ambient lighting information 530 for an outdoor, sunny environment may include brightness information 535 of approximately 3,500 lumens and color information 540 of approximately 5,500 Kelvin. By contrast, the ambient lighting information 530 for an indoor space lit only by a lamp may include brightness information 535 of approximately 450 lumens and color information 540 of approximately 2,700 Kelvin.

At 550, outward lighting module 165 determines whether the ambient lighting conditions satisfy the brightness criterion associated with the media item displayed in block 510. In some embodiments, outward lighting module 165 may compare brightness information 535 to the brightness criterion to determine whether the brightness criterion is satisfied. In accordance with a determination that the ambient lighting conditions do not satisfy the brightness criterion, outward lighting module 165 may determine a set of pixels in the outward-facing display device 210 corresponding to an area of interest in block 560.

Determining the set of pixels in block 560 may optionally include blocks 565 and/or 570. At block 565, outward lighting module 165 may determine the area of interest based on an indicator from a gaze-tracking user interface. For example, outward lighting module 165 may receive an indicator from a gaze-tracking user interface that the user 250 is looking at the object of interest 420 on table 410 in environment 400. At block 570, outward lighting module 165 may determine the area of interest based on an input region of a gesture-based user interface. For example, the gesture-based user interface may provide an indicator of the input region in which the hands of user 250 are making gestures to outward lighting module 165.

At 580, outward lighting module 165 may drive the set of pixels determined in block 560 at a brightness 585 and color 540 to improve lighting in the area of interest of the environment. Driving the set of pixels in block 580 may optionally include block 590, at which outward lighting module 165 may drive the set of pixels determined in block 560 at a brightness 585 such that the brightness criterion associated with the media item displayed in block 510 is satisfied. Because the ambient lighting information 530 comprises color information 540, outward lighting module 165 may drive the set of pixels in the outward facing display 210 at a matching color 540, such that the user 250 experiences a more cohesive illumination of the environment. In addition, outward lighting module 165 may determine a minimum brightness 585 at which to drive the pixels such that the combination of the brightness 535 of the ambient lighting and the brightness 585 of the outward display device satisfy the brightness criterion without causing colors in the environment to be perceived as "washed out."

Figure 6:
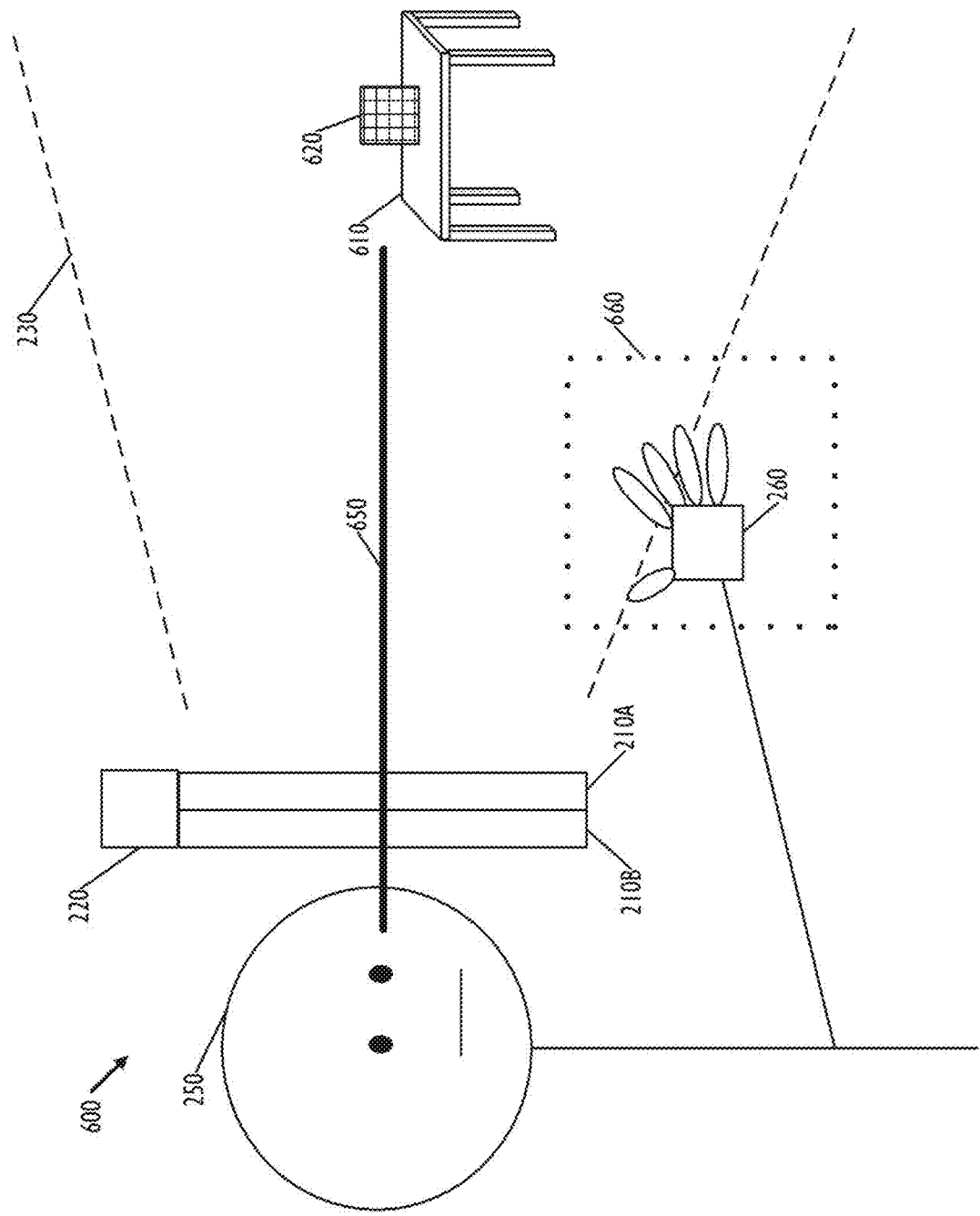
FIG. 6 shows a diagram of an example operating environment for an outward-facing display in an electronic device performing the example process shown in FIG. 5, according to one or more embodiments.

FIG. 6 shows a diagram of an example operating environment 600 for an outward-facing display in an electronic device performing the example process 500 shown in FIG. 5, according to one or more embodiments. Display device 210 comprises an outward-facing display device 210A and an inward-facing display device 210B, as well as the optical sensor 220. The inward-facing display device 210B and the outward-facing display device 210A are positioned such that a projection from the inward-facing display device 210B and a projection from the outward-facing display device 210A do not intersect. That is, the inward-facing display device 210B and the outward-facing display device 210A face different directions in the environment. In the example operating environment 600, the inward-facing display device 210B faces towards the user 250, and the outward-facing display device 210A faces away from the user 250 towards the environment. In other operating environments, the inward-facing display device 210B and the outward-facing display device 210A may be on opposite or approximately opposite sides of the display device 210, on difference sides of the display device 210, and the like. The inward-facing display device 210B may display a media item associated with a particular brightness criterion, such as the movie media item and associated brightness criterion for a dark, movie theater environment. Optical sensor 220 may obtain information indicative of ambient lighting conditions in environment 600, and outward lighting module 165 may determine the ambient lighting conditions do not satisfy the associated brightness criterion and drive selected pixels of outward-facing display device 210A accordingly.

For example, although the brightness criterion associated with the movie media item may correspond to a dark movie theater, a gesture-based user interface may have an associated brightness criterion representative of a threshold brightness below which it cannot recognize hand gestures. Outward lighting module 165 may drive a set of pixels along a bottom portion of outward-facing display device 210A to illuminate the input region 660 of the gesture-based user interface and the hands 260 of the user 250. As another example, a gaze-tracking interface may determine the gaze 650 of the user 250 is directed towards an object of interest 620 on table 610. Outward lighting module 165 may then drive a set of pixels in a middle portion of outward-facing display device 210A to illuminate the object of interest 620. As a further example, display device 210 may be included in an HMD. Inward-facing display device 210B may be used to present content to user 250, and outward-facing display device 210A may be used to present information to people nearby user 250. The HMD may further include an eye-tracking system to track gaze 650 of user 250 and an external camera or other sensor 220 on a same surface as the outward-facing display device 210A to determine ambient lighting conditions for the outward-facing display device 210A. Outward lighting module 165 may determine gaze 650 is directed towards an object of interest 620 on table 610 based on information from the eye-tracking system in the HMD, and drive a set of pixels in a middle portion of outward-facing display device 210A to illuminate the object of interest 620. The upper and lower portions of outward-facing display device 210A remain available to present information to people nearby user 250.

Figure 7:
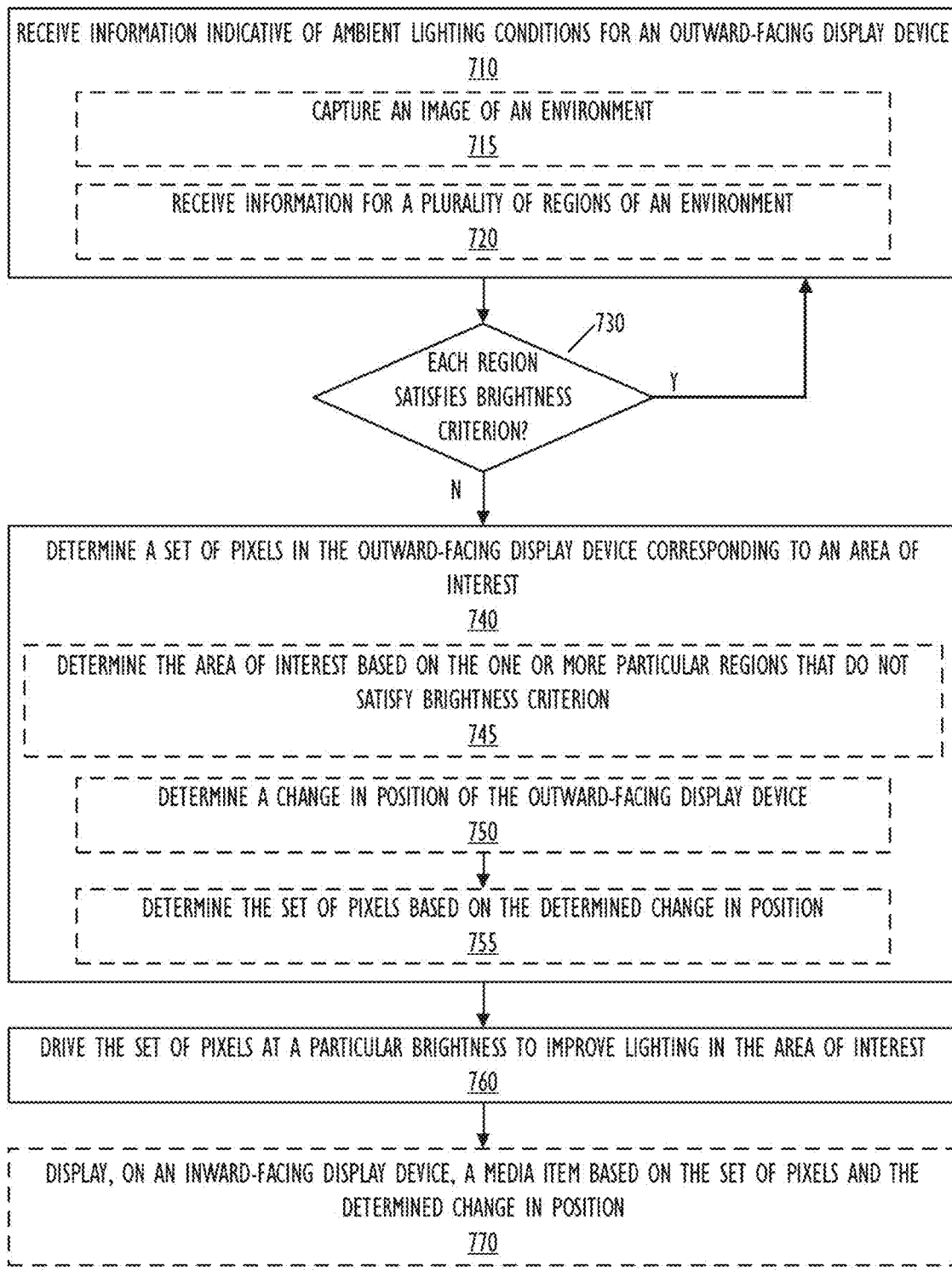
FIG. 7 shows, in flow chart form, a further example process for operating an outward-facing display in an electronic device in low light conditions, according to one or more embodiments.

FIG. 7 shows, in flow chart form, a further example process for operating an outward-facing display in an electronic device in low light conditions, according to one or more embodiments. In one or more embodiments, certain actions take place as part of receiving information indicative of ambient lighting conditions for an outward-facing display device and determining a set of pixels in the outward-facing display device corresponding to an area of interest. Still other actions comprise additional functionality. However, the various actions may take place in other locations within the flow chart of FIG. 7. For purposes of explanation, the following steps will be described in the context of FIGS. 1 and 2. However, it should be understood that the various actions may be taken by alternate components. In addition, the various actions may be performed in a different order. Further, some actions may be performed simultaneously, and some may not be required, or others may be added, according to various embodiments. The various actions may be performed remotely by a server device, by a single electronic device, and/or distributed between multiple electronic devices.

The flow chart begins at 710, where outward lighting module 165 receives information indicative of ambient lighting conditions for an outward-facing display device. Receiving information indicative of ambient lighting conditions in block 710 may optionally include blocks 715 and/or 720. At block 715, an optical sensor 220 comprising an outward-facing camera captures an image of the environment, and outward lighting module 165 may determine the ambient lighting conditions based on the captured image from optical sensor 220. Alternatively, ambient lighting module 170 may determine the ambient lighting conditions based on the captured image from optical sensor 220 and provide information indicative of the ambient lighting conditions to outward lighting module 165. At block 720, outward lighting module 165 receives information indicative of ambient lighting conditions for a plurality of regions of an environment. For example, outward lighting module 165 may receive information indicative of ambient lighting conditions for each of four quadrants in the environment.

At 730, outward lighting module 165 determines whether the ambient lighting conditions satisfy the brightness criterion. In embodiments including block 720, step 730 includes determining whether each region satisfies the brightness criterion. For example, a lamp in one corner of the room illuminates three of the four quadrants in the environment. Ambient lighting conditions in three of the four quadrants satisfy the brightness criterion but the fourth quadrant does not. In accordance with a determination that one or more regions do not satisfy the brightness criterion, outward lighting module 165 may determine a set of pixels in the outward-facing display device 210 corresponding to an area of interest in the environment.

Determining the set of pixels at block 740 may optionally include blocks 745 and/or 750-755. At block 745, outward lighting module 165 determines the area of interest based on the one or more particular regions of the environment that do not satisfy the brightness criterion. For example when an area of interest is not included in the particular regions, outward lighting module 165 may determine the area of interest requires less additional illumination and include fewer pixels in the set of pixels than when the area of interest is included in the particular regions and requires more additional illumination. At block 750, outward lighting module 165 determines a change in position of the outward-facing display device 210 and determines the set of pixels based on the determined change in position in block 755. For example, an accelerometer included in sensors 145 may determine user 250 holding display device 210 has moved from a seated position to a standing position. Outward lighting module 165 may then determine that an area of interest is the ground and a pathway the user 250 is expected to move along. Outward lighting module 165 determines the set of pixels corresponding to the area of interest includes pixels in a bottom portion of display 210 which illuminate the ground in front of the feet of user 250.

At 760, outward lighting module 165 drives the set of pixels at a particular brightness to improve lighting in the area of interest. In embodiments in which display device 210 further comprises an inward-facing display device, at block 770 a media item may optionally be displayed on the inward-facing display device based on the set of pixels and the determined change in position. Returning to the example in which the user 250 has moved from a seated position to a standing position, a media item indicative of a recommended path through the environment may be displayed on the inward-facing display device. As another example, a media item incorporating warnings of obstacles identified in the environment may be displayed on the inward-facing display device.

Figure 8A:
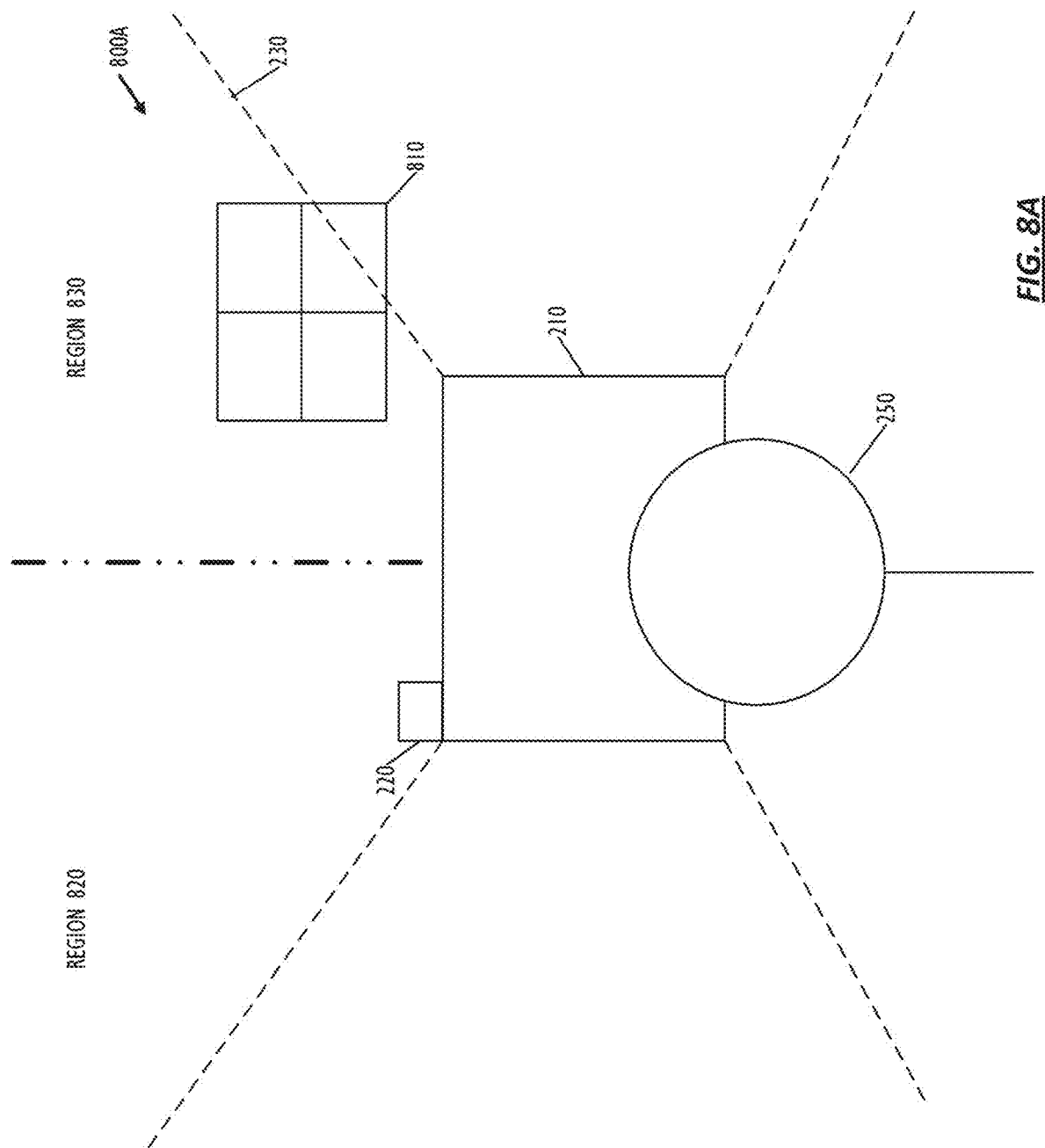
FIGS. 8A-8B show diagrams of an example operating environment for an outward-facing display in an electronic device performing the example process shown in FIG. 7, according to one or more embodiments.
Figure 8B:
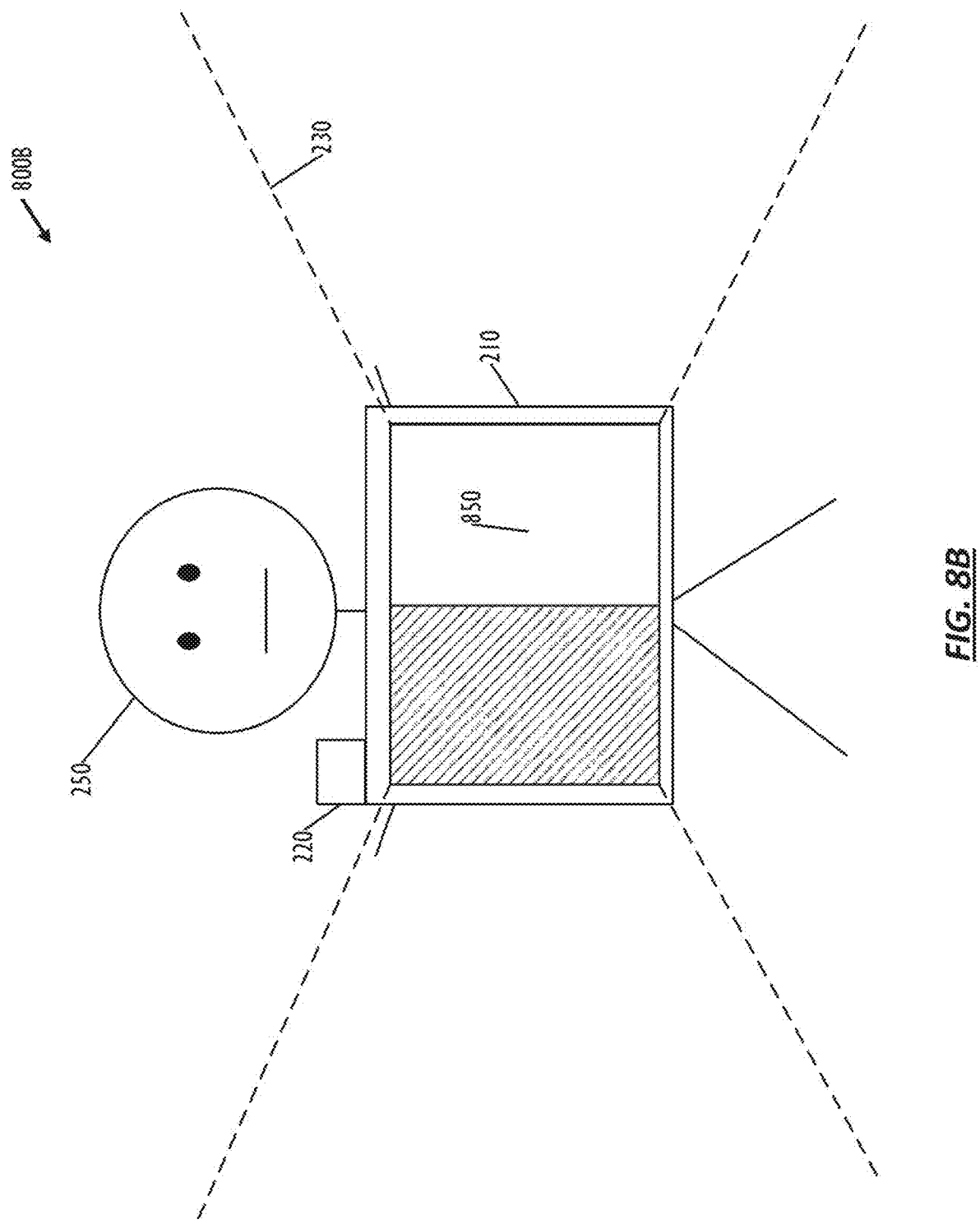

FIGS. 8A-B show diagrams of an example operating environment 800 for an outward-facing display in an electronic device performing the example process shown in FIG. 7, according to one or more embodiments. In the view 800A shown in FIG. 8A corresponding to the perspective of user 250, the environment is divided into two regions: region 820 to the left of user 250 and region 830 to the right of user 250. Region 830 includes a window 810 through which sunlight may illuminate the room. Ambient lighting conditions in region 830 may satisfy the brightness criterion while ambient lighting conditions in region 820 without a window do not satisfy the brightness criterion. FIG. 8B shows a front view 800B illustrating which pixels of display 210 are included in region 850 to illuminate the region 820 shown in the view 800A of FIG. 8A. The set of pixels 850 includes pixels in a portion of display 210 along the right side while pixels along the left side of display 210 and corresponding to region 830 and window 810 are left dark.

Figure 9:
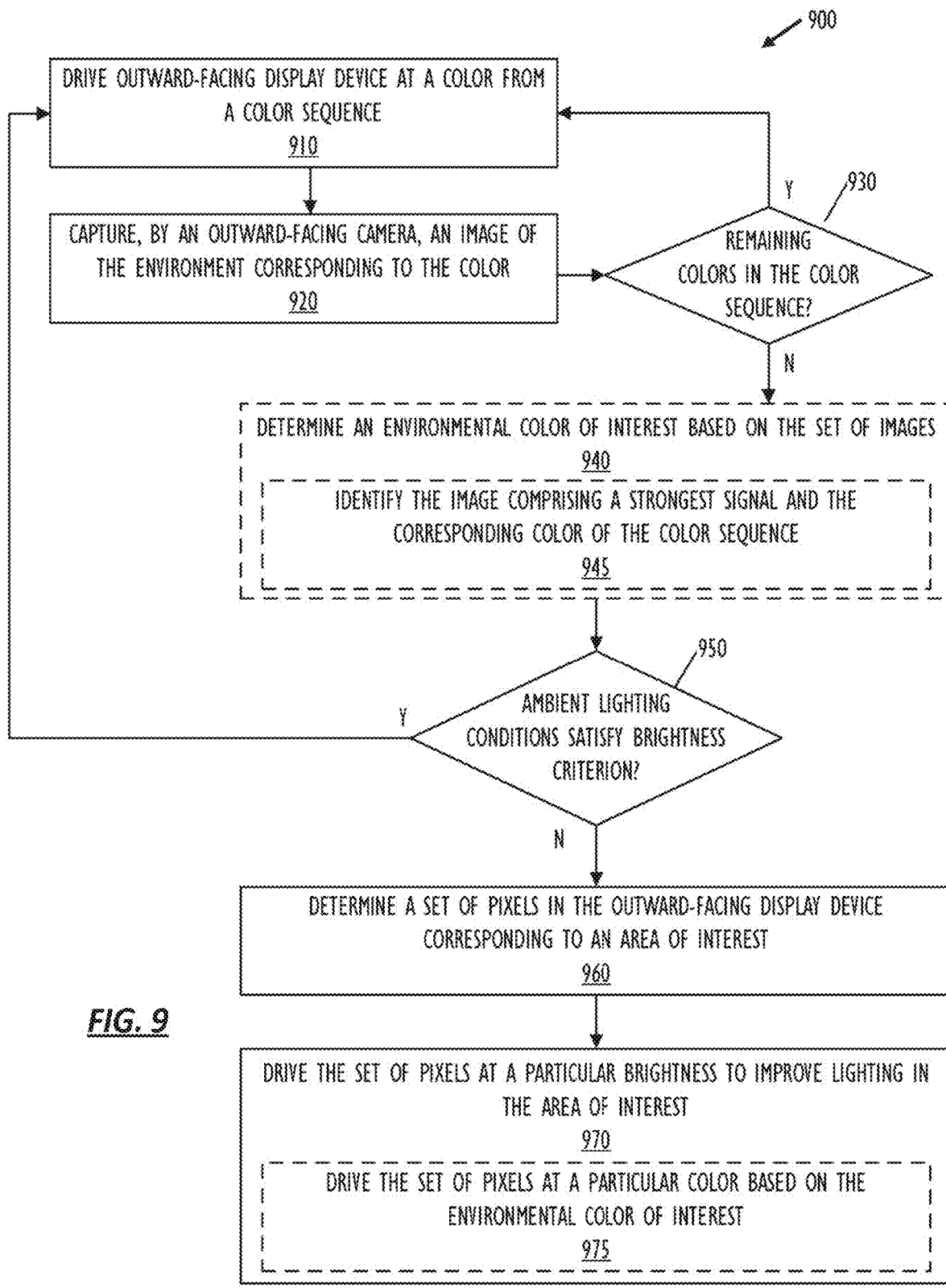
FIG. 9 shows, in flow chart form, an example process for determining ambient lighting conditions, according to one or more embodiments.

FIG. 9 shows, in flow chart form, an example process 900 for determining ambient lighting conditions, according to one or more embodiments. In one or more embodiments, certain actions take place as part of determining an environmental color of interest. Still other actions comprise additional functionality. However, the various actions may take place in other locations within the flow chart of FIG. 7. For purposes of explanation, the following steps will be described in the context of FIGS. 1 and 2. However, it should be understood that the various actions may be taken by alternate components. In addition, the various actions may be performed in a different order. Further, some actions may be performed simultaneously, and some may not be required, or others may be added, according to various embodiments. The various actions may be performed remotely by a server device, by a single electronic device, and/or distributed between multiple electronic devices.

At 910, outward lighting module 165 drives outward-facing display device 210 at a particular color from a color sequence. For example, the color sequence may include a sequence of red, orange, yellow, green, blue, and purple colors. At 920, outward lighting module 165 causes an outward-facing camera such as optical sensor 220 to capture an image of the environment corresponding to the color from the color sequence driven at block 910. In some embodiments, optical sensor 220 comprises a black and white camera, which may be more sensitive in low light conditions than a red/green/blue camera. At 930, outward lighting module 165 determines whether there are any remaining colors in the color sequence. If there are colors remaining in the color sequence, outward lighting module 165 returns to block 910 and drives outward-facing display device 210 at another color from the color sequence.

When images corresponding to each of the colors in the color sequence have been captured, outward lighting module 165 may optionally determine an environmental color of interest based on the set of images in block 940. For example, outward lighting module 165 may determine a color temperature of ambient lighting in the environment, a color range of objects in the environment, and the like. Determining an environmental color of interest in block 940 may optionally include block 945. In embodiments in which optical sensor 220 comprises a black and white camera and the set of images comprises a set of black and white images, outward lighting module 165 identifies an image comprising a strongest signal and what color of the color sequence corresponds to the particular image at 945. As a result, the system gains the benefit of the increased sensitivity of a black and white camera without sacrificing color information.

At 950, outward lighting module 165 determines whether the ambient lighting conditions satisfy a brightness criterion. In accordance with a determination that the ambient lighting conditions do not satisfy the brightness criterion, outward lighting module 165 may determine a set of pixels in outward-facing display device 210 corresponding to an area of interest at 960. Outward lighting module 165 drives the set of pixels at a particular brightness to improve lighting in the area of interest at block 970.

In embodiments in which outward lighting module 165 determines an environmental color of interest in block 940, driving the set of pixels at a particular brightness at block 970 may optionally include block 975. In block 975, outward lighting module 165 may drive the set of pixels at a particular color based on the environmental color of interest. For example, the environmental color of interest may indicate that furniture in the environment is a blue color and the ambient lighting conditions may indicate that the room is dark. While outward lighting module 165 may default to driving the set of pixels at a red color in dark environments such that the dark vision of user 250 is not disrupted, red-colored light may be absorbed by the blue-colored furniture, rather than reflected, such that user 250 is unable to see the furniture. Instead, outward lighting module 165 may drive the set of pixels at a particular blue color to ensure that user 250 is able to see the blue-colored furniture.

Figure 10:
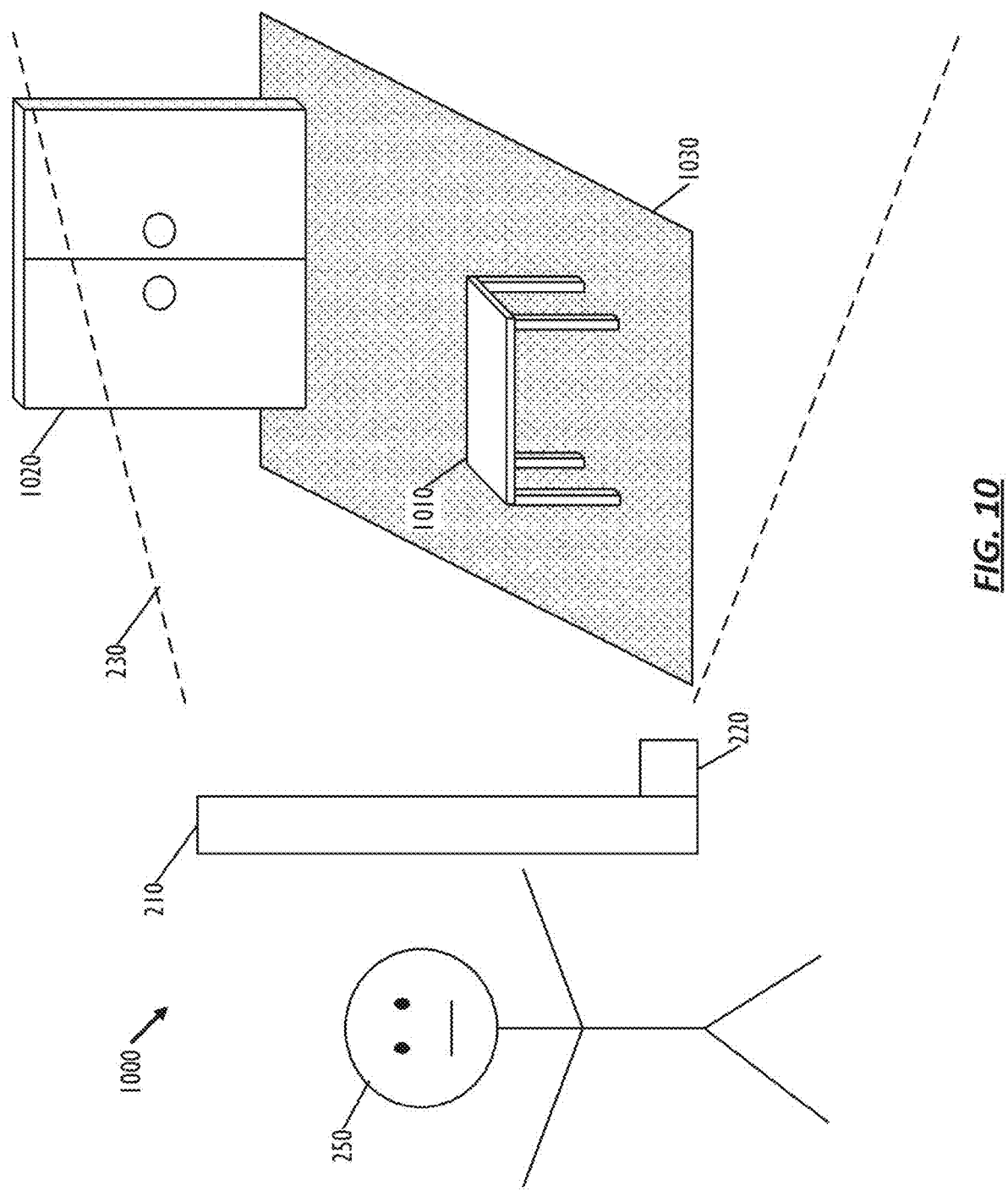
FIG. 10 shows a diagram of an example operating environment for an outward-facing display in an electronic device performing the example process shown in FIG. 9, according to one or more embodiments.

FIG. 10 shows a diagram of an example operating environment 1000 for an outward-facing display in an electronic device performing the example process shown in FIG. 9, according to one or more embodiments. In environment 1000, a table 1010 and a cabinet 1020 are made of a light-colored wood and placed on a dark-colored rug 1030. Optical sensor 220 may comprise an outward-facing camera which captures a set of images of the environment 1000 corresponding to each color in a color sequence. Outward lighting module 165 may determine the environmental color of interest corresponds to the color of the table 1010 and the cabinet 1020 based on the set of images from optical sensor 220. User 250 may change position from seated to standing, and outward lighting module 165 may drive a set of pixels in outward-facing display device 210 to illuminate a walking path for user 250. Outward lighting module 165 may drive the set of pixels at a particular color that is reflected off of table 1010 and cabinet 1020 such that user 250 is able to clearly see them and avoid them when walking through environment 1000.

Figure 11A:
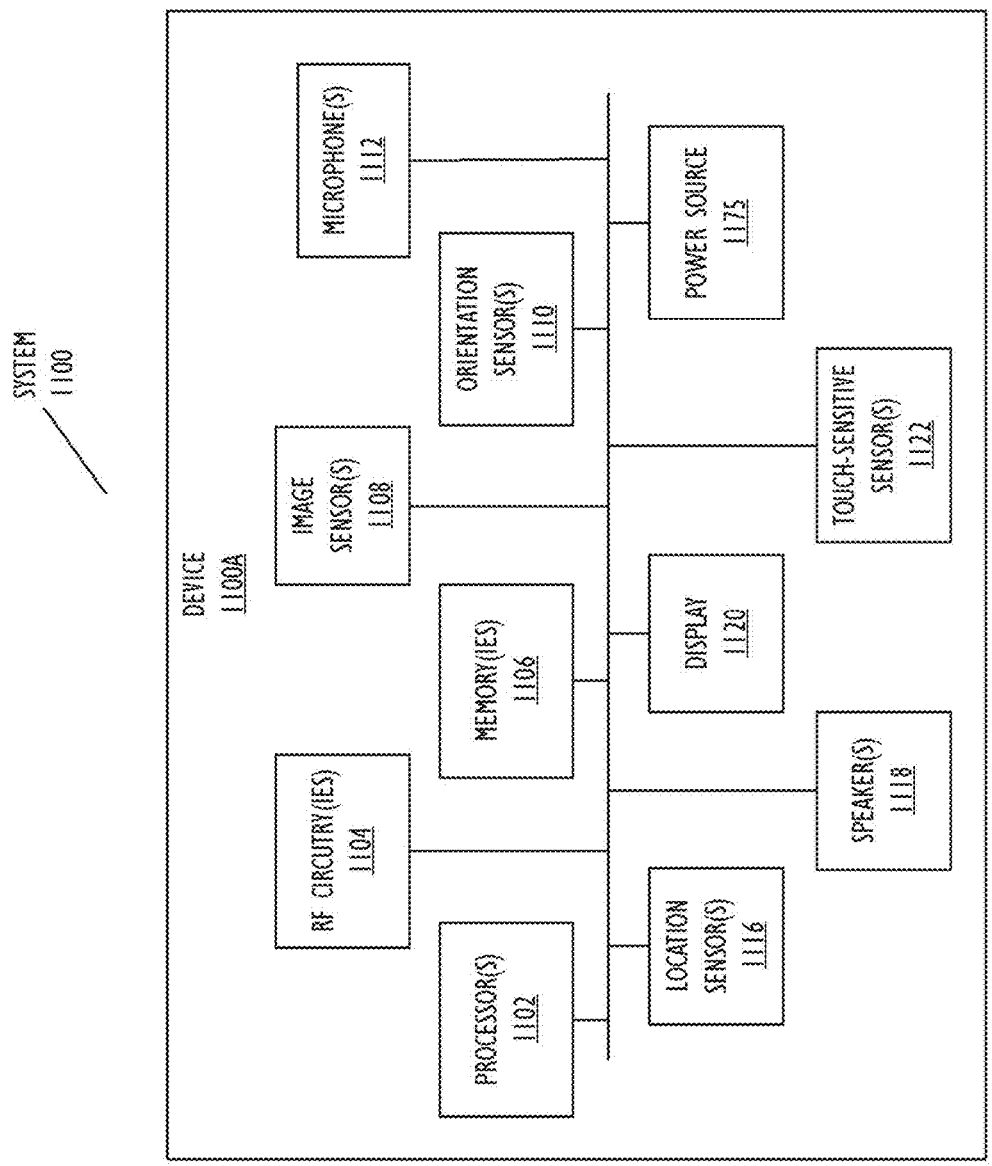
FIGS. 11A-11B show, in block diagram form, an example computer system in accordance with one or more embodiments.
Figure 11B:
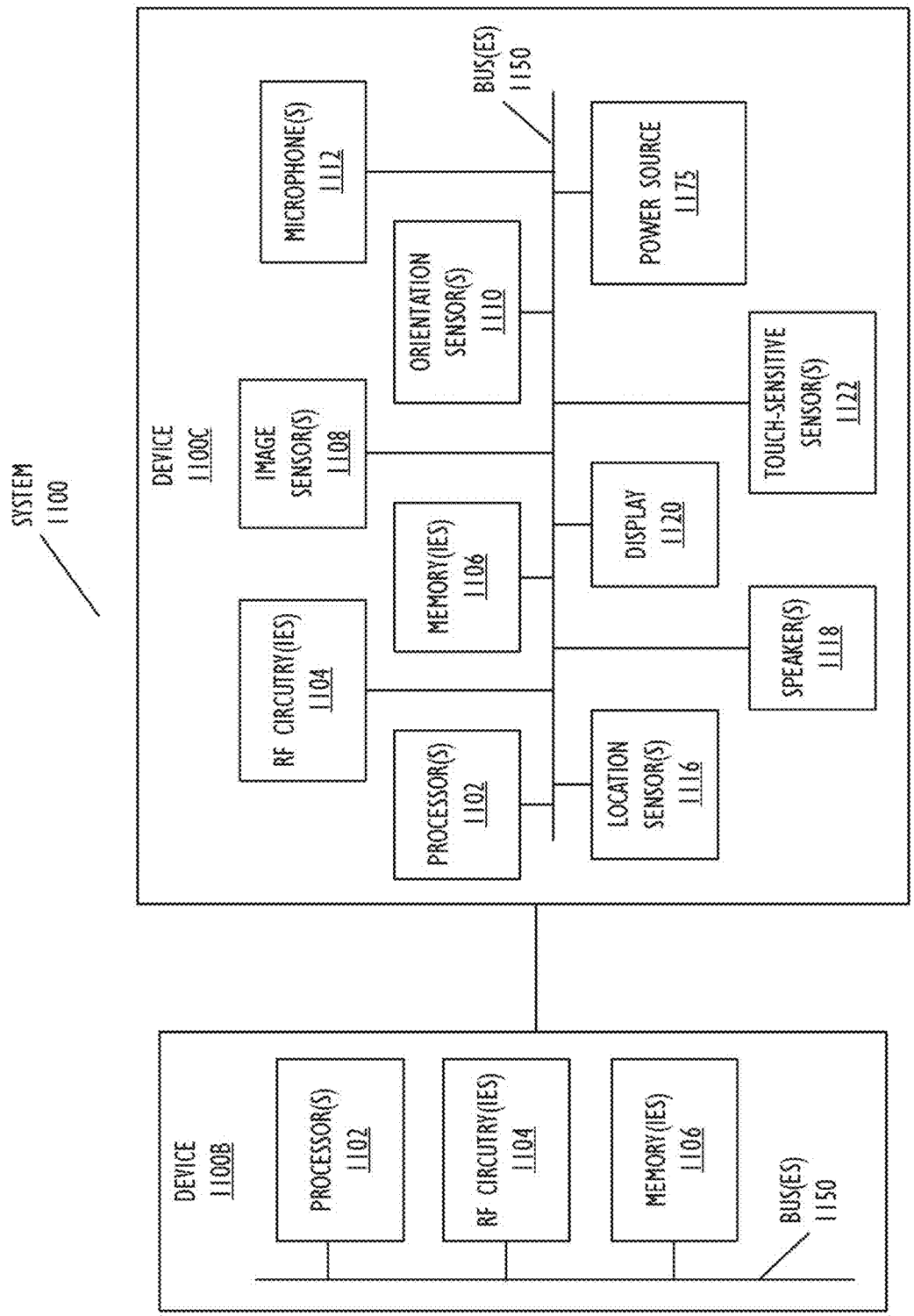

FIGS. 11A-B show, in block diagram form, an example computer system in accordance with one or more embodiments. FIG. 11A and FIG. 11B depict exemplary system 1100 for use in various extended reality technologies.

In some examples, as illustrated in FIG. 11A, system 1100 includes device 1100a. Device 1100a includes various components, such as processor(s) 1102, RF circuitry(ies) 1104, memory(ies) 1106, image sensor(s) 1108, orientation sensor(s) 1110, microphone(s) 1112, location sensor(s) 1116, speaker(s) 1118, display(s) 1120, and touch-sensitive surface(s) 1122. Power source 1175 may comprise a rechargeable battery (e.g., a lithium-ion battery, or the like) or other electrical connection to a power supply, e.g., to a main power source, that is used to manage and/or provide electrical power to the electronic components and associated circuitry of device 1100. These components optionally communicate over communication bus(es) 1150 of device 1100a.

In some examples, elements of system 1100 are implemented in a base station device (e.g., a computing device, such as a remote server, mobile device, or laptop) and other elements of system 1100 are implemented in a second device (e.g., a head-mounted device). In some examples, device 1100a is implemented in a base station device or a second device.

As illustrated in FIG. 11B, in some examples, system 1100 includes two (or more) devices in communication, such as through a wired connection or a wireless connection. First device 1100B (e.g., a base station device) includes processor(s) 1102, RF circuitry(ies) 1104, and memory(ies) 1106. These components optionally communicate over communication bus(es) 1150 of device 1100B. Second device 1100C (e.g., a head-mounted device) includes various components, such as processor(s) 1102, RF circuitry(ies) 1104, memory(ies) 1106, image sensor(s) 1108, orientation sensor(s) 1110, microphone(s) 1112, location sensor(s) 1116, speaker(s) 1118, display(s) 1120, and touch-sensitive surface(s) 1122. These components optionally communicate over communication bus(es) 1150 of device 1100c.

System 1100 includes processor(s) 1102 and memory(ies) 1106. Processor(s) 1102 include one or more general processors, one or more graphics processors, and/or one or more digital signal processors. In some examples, memory(ies) 1106 are one or more non-transitory computer-readable storage mediums (e.g., flash memory, random access memory) that store computer-readable instructions configured to be executed by processor(s) 1102 to perform the techniques described below.

System 1100 includes RF circuitry(ies) 1104. RF circuitry(ies) 1104 optionally include circuitry for communicating with electronic devices, networks, such as the Internet, intranets, and/or a wireless network, such as cellular networks and wireless local area networks (LANs). RF circuitry(ies) 1104 optionally includes circuitry for communicating using near-field communication and/or short-range communication, such as Bluetooth®.

System 1100 includes display(s) 1120. Display(s) 1120 may have an opaque display. Display(s) 1120 may have a transparent or semi-transparent display that may incorporate a substrate through which light representative of images is directed to an individual's eyes. Display(s) 1120 may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one example, the transparent or semi-transparent display may transition selectively between an opaque state and a transparent or semi-transparent state. Other examples of display(s) 1120 include heads up displays, automotive windshields with the ability to display graphics, windows with the ability to display graphics, lenses with the ability to display graphics, tablets, smartphones, and desktop or laptop computers. Alternatively, system 1100 may be designed to receive an external display (e.g., a smartphone). In some examples, system 1100 is a projection-based system that uses retinal projection to project images onto an individual's retina or projects virtual objects into a physical setting (e.g., onto a physical surface or as a holograph).

In some examples, system 1100 includes touch-sensitive surface(s) 1122 for receiving user inputs, such as tap inputs and swipe inputs. In some examples, display(s) 1120 and touch-sensitive surface(s) 1122 form touch-sensitive display(s).

System 1100 includes image sensor(s) 1108. Image sensors(s) 1108 optionally include one or more visible light image sensor, such as charged coupled device (CCD) sensors, and/or complementary metal-oxide-semiconductor (CMOS) sensors operable to obtain images of physical elements from the physical setting. Image sensor(s) also optionally include one or more infrared (IR) sensor(s), such as a passive IR sensor or an active IR sensor, for detecting infrared light from the physical setting. For example, an active IR sensor includes an IR emitter, such as an IR dot emitter, for emitting infrared light into the physical setting. Image sensor(s) 1108 also optionally include one or more event camera(s) configured to capture movement of physical elements in the physical setting. Image sensor(s) 1108 also optionally include one or more depth sensor(s) configured to detect the distance of physical elements from system 1100. In some examples, system 1100 uses CCD sensors, event cameras, and depth sensors in combination to detect the physical setting around system 1100. In some examples, image sensor(s) 1108 include a first image sensor and a second image sensor. The first image sensor and the second image sensor are optionally configured to capture images of physical elements in the physical setting from two distinct perspectives. In some examples, system 1100 uses image sensor(s) 1108 to receive user inputs, such as hand gestures. In some examples, system 1100 uses image sensor(s) 1108 to detect the position and orientation of system 1100 and/or display(s) 1120 in the physical setting. For example, system 1100 uses image sensor(s) 1108 to track the position and orientation of display(s) 1120 relative to one or more fixed elements in the physical setting.

In some examples, system 1100 includes microphones(s) 1112. System 1100 uses microphone(s) 1112 to detect sound from the user and/or the physical setting of the user. In some examples, microphone(s) 1112 includes an array of microphones (including a plurality of microphones) that optionally operate in tandem, such as to identify ambient noise or to locate the source of sound in space of the physical setting.

System 1100 includes orientation sensor(s) 1110 for detecting orientation and/or movement of system 1100 and/or display(s) 1120. For example, system 1100 uses orientation sensor(s) 1110 to track changes in the position and/or orientation of system 1100 and/or display(s) 1120, such as with respect to physical elements in the physical setting. Orientation sensor(s) 1110 optionally include one or more gyroscopes and/or one or more accelerometers.

The techniques defined herein consider the option of obtaining and utilizing a user's personal information. For example, such personal information may be utilized in order to provide a multi-user communication session on an electronic device. However, to the extent such personal information is collected, such information should be obtained with the user's informed consent, such that the user has knowledge of and control over the use of their personal information.

Parties having access to personal information will utilize the information only for legitimate and reasonable purposes, and will adhere to privacy policies and practices that are at least in accordance with appropriate laws and regulations. In addition, such policies are to be well-established, user-accessible, and recognized as meeting or exceeding governmental/industry standards. Moreover, the personal information will not be distributed, sold, or otherwise shared outside of any reasonable and legitimate purposes.

Users may, however, limit the degree to which such parties may obtain personal information. The processes and devices described herein may allow settings or other preferences to be altered such that users control access of their personal information. Furthermore, while some features defined herein are described in the context of using personal information, various aspects of these features can be implemented without the need to use such information. As an example, a user's personal information may be obscured or otherwise generalized such that the information does not identify the specific user from which the information was obtained.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 3, 5, 7, and 9 or the arrangement of elements shown in FIGS. 1, 2, and 11 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method, comprising:
   receiving, by a head-mounted device, information indicative of ambient lighting conditions in a physical environment, wherein the head-mounted device comprises a plurality of outward-facing illuminators directed toward the physical environment and a user-tracking sensor; and
   in accordance with a determination that the ambient lighting conditions in the physical environment fail satisfy a brightness criterion:
      determining an area of interest in the physical environment in accordance with sensor data from the user-tracking sensor,
      identifying a first outward-facing illuminator of the plurality of outward-facing illuminators corresponding to the area of interest, and
      activating the first outward-facing illuminator to illuminate the area of interest.

2. The method of claim 1, further comprising:
   determining a target light color corresponding to the area of interest in the physical environment; and
   activating the first outward-facing illuminator to illuminate in accordance with the target light color.

3. The method of claim 1, wherein the user-tracking sensor comprises a gaze tracking sensor, and wherein the area of interest is determined based on a direction of the gaze.

4. The method of claim 1, wherein the area of interest corresponds to an input region of the physical environment, wherein the input region comprises a gesture-based user interface.

5. The method of claim 1, wherein receiving the information indicative of the ambient lighting conditions comprises capturing, by an outward-facing camera, an image of the physical environment.

6. The method of claim 5, wherein the outward-facing camera is arranged facing in a same direction as one or more of the plurality of outward-facing illuminators.

7. A non-transitory computer readable medium comprising computer readable code executable by one or more processors to:
   receive, by a head-mounted device, information indicative of ambient lighting conditions in a physical environment, wherein the head-mounted device comprises a plurality of outward-facing illuminators directed toward the physical environment and a user-tracking sensor; and in accordance with a determination that the ambient lighting conditions in the physical environment fail satisfy a brightness criterion:
    determine an area of interest in the physical environment in accordance with sensor data from the user-tracking sensor,
    identify a first outward-facing illuminator of the plurality of outward-facing illuminators corresponding to the area of interest, and
    activate the first outward-facing illuminator to illuminate the area of interest.

8. The non-transitory computer readable medium of claim 7, further comprising computer readable code to:
determine a target light color corresponding to the area of interest in the physical environment; and
activate the first outward-facing illuminator to illuminate in accordance with the target light color.

9. The non-transitory computer readable medium of claim 7, wherein the user-tracking sensor comprises a gaze tracking sensor, and wherein the area of interest is determined based on a direction of the gaze.

10. The non-transitory computer readable medium of claim 7, wherein the area of interest corresponds to an input region of the physical environment, wherein the input region comprises a gesture-based user interface.

11. The non-transitory computer readable medium of claim 7, wherein the computer readable code to receive the information indicative of the ambient lighting conditions comprises computer readable code to cause an outward-facing camera to capture an image of the physical environment.

12. The non-transitory computer readable medium of claim 11, wherein the outward-facing camera is arranged facing in a same direction as one or more of the plurality of outward-facing illuminators.

13. A system comprising:
one or more processors; and
one or more computer readable media comprising computer readable code executable by the one or more processors to:
    receive, by a head-mounted device, information indicative of ambient lighting conditions in a physical environment, wherein the head-mounted device comprises an plurality of outward-facing illuminators directed toward the physical environment and a user-tracking sensor; and
    in accordance with a determination that the ambient lighting conditions in the physical environment fail satisfy a brightness criterion:
        determine an area of interest in the physical environment in accordance with sensor data from the user-tracking sensor,
        identify a first outward-facing illuminator of the plurality of outward-facing illuminators corresponding to the area of interest, and
        activate the first outward-facing illuminator to illuminate the area of interest.

14. The system of claim 13, further comprising computer readable code to:
determine a target light color corresponding to the area of interest in the physical environment; and
activate the first outward-facing illuminator to illuminate in accordance with the target light color.

15. The system of claim 13, wherein the user-tracking sensor comprises a gaze tracking sensor, and wherein the area of interest is determined based on a direction of the gaze.

16. The system of claim 13, wherein the area of interest corresponds to an input region of the physical environment, wherein the input region comprises a gesture-based user interface.

17. The system of claim 13, wherein the computer readable code to receive the information indicative of the ambient lighting conditions comprises computer readable code to cause an outward-facing camera to capture an image of the physical environment.

\* \* \* \* \*